United States Patent
Sieg et al.

[11] Patent Number: 5,979,618
[45] Date of Patent: Nov. 9, 1999

[54] VIBRATION DAMPER, IN PARTICULAR FOR A HELICOPTER ROTOR

[75] Inventors: Thierry Sieg, Vineuil Saint-Firmin; Patrice Levallard, Bry-sur-Marne, both of France

[73] Assignee: Hutchinson, Paris, France

[21] Appl. No.: 08/758,834

[22] Filed: Dec. 4, 1996

[30] Foreign Application Priority Data

Oct. 15, 1996 [FR] France .................................. 96 12547

[51] Int. Cl.$^6$ ........................................................ F16F 9/00
[52] U.S. Cl. ........................................................ 188/322.19
[58] Field of Search ..................... 188/322.11, 322.22, 188/322.5, 311, 312, 316, 300, 902, 322.19; 267/64.15, 64.25, 124, 140.11, 140.13, 217, 219, 220, 140.14, 140.15; 248/562, 618, 636; 280/709, 710; 416/106, 140, 134 A

[56] References Cited

U.S. PATENT DOCUMENTS

| | | |
|---|---|---|
| 2,502,322 | 3/1950 | Iredell, Jr. . |
| 2,555,347 | 6/1951 | Lee . |
| 3,947,007 | 3/1976 | Pelat . |
| 4,773,632 | 9/1988 | Hartel .................................. 267/140.11 |
| 4,957,279 | 9/1990 | Thorn . |
| 5,286,013 | 2/1994 | Seymour .................................. 188/316 |
| 5,366,193 | 11/1994 | Lindsay . |
| 5,373,920 | 12/1994 | Valdivia et al. . |
| 5,692,728 | 12/1997 | Shiozawa .................................. 248/618 |

FOREIGN PATENT DOCUMENTS

| | | |
|---|---|---|
| 62137442 | 6/1987 | European Pat. Off. . |
| 486227 | 5/1992 | European Pat. Off. . |
| 557947 | 9/1993 | European Pat. Off. . |
| 2255508 | 7/1975 | France . |
| 3738716 | 9/1988 | Germany . |
| 3913819 | 10/1990 | Germany . |
| 4034573 | 5/1991 | Germany . |
| 5-99267 | 4/1993 | Japan . |

Primary Examiner—Christopher P. Schwartz
Assistant Examiner—C. T. Bartz
Attorney, Agent, or Firm—Alston & Bird LLP

[57] ABSTRACT

The present invention relates to a vibration damper, in particular for a helicopter rotor, the damper comprising a driving element having a "main" axis and a rigid element, and including a damping assembly functionally interconnecting the driving element and the rigid element to damp vibrations in at least one direction perpendicular to said main axis. The damper includes a hydraulic damper device having first and second sets of plane laminations each having its plane perpendicular to the main axis, the laminations of the first and second sets being interleaved and narrowly spaced apart so as to present viscous damping zones each situated between one of the laminations of the first set and one of the laminations of the second set. The damper includes an elastic element having low stiffness parallel to the main axis so as to decouple compression excitation between the driving element and the rigid element.

20 Claims, 3 Drawing Sheets

VIBRATION DAMPER, IN PARTICULAR FOR A HELICOPTER ROTOR

The present invention relates to a vibration damper, in particular for a helicopter rotor, and more particularly a semi-rigid rotor, i.e. a rotor having bearingless blades.

BACKGROUND OF THE INVENTION

United States patent U.S. Pat. No. 5,540,549 relates to a fluid damper device comprising a driving element which is constituted by an internal member 22 possessing an axial direction end driven by a drive element which includes a moving element 23 and a ball joint 65 intended to compensate in particular for cocking motion of the helicopter blade and also for twisting motion thereof due to pitch control.

Damping is provided firstly by a laminated structure 28 of alternating rigid layers 28 and elastomer layers 32, and secondly by a piston 38 which moves in a fluid chamber. The laminated structure has high stiffness parallel to the above-mentioned axial direction and low stiffness in a direction perpendicular to the axial direction.

The piston 38 serves to obtain vibration damping over the entire range of vibration amplitude by simultaneously implementing two related phenomena, firstly a "throttling" phenomenon of headless through a constriction, and secondly a viscous braking phenomenon, i.e. damping by shear in a viscous oil, with the oil used being a silicone oil having a viscosity lying in the range 10,000 centistokes to 100,000 centistokes (1 stoke=$10^{-4}$ m$^2$/s).

That device suffers from the following drawbacks:

firstly, the throttling phenomenon predominates when high amplitude damping forces are required, which is the case in the intended application to helicopter rotors; and secondly, it does not escape from the effects on the device of the compression vibrations that take place with helicopter rotors. Such compression vibrations affect the fatigue characteristics of the system. It may be observed that the ball joint 65 serves to act only on torsion and cocking motion but that it does not avoid the compression phenomenon.

The first above-mentioned drawback gives rise to poor linearity in the damper device which is due to the fact that damping by throttling is naturally non-linear since it varies with the square of displacement speed.

The second drawback identified by the present Applicant is accompanied in above-mentioned patent U.S. Pat. No. 5,540,549 by a parasitic phenomenon which induces modulation of the damping by viscous braking. That damping depends to a large extent on the clearance that exists between the piston 38 and the walls of the chamber, and also on the exact axial direction of the piston. Since the effect of the compression phenomenon tends to alter the direction of the piston axis and/or to move it off-center, there results a damping modulation phenomenon which adds to the non-linearity of said damping by throttling.

OBJECTS AND SUMMARY OF THE INVENTION

An object of the invention is to provide a vibration damper that does not present the above-mentioned drawbacks.

The invention is based on the idea of using damping that does not implement the said throttling phenomenon, but that does implement damping by viscous braking based on shear, and of giving the device effective decoupling between shear motion and compression excitation.

In a first embodiment, the invention provides a vibration damper, in particular for a helicopter rotor, the damper comprising a driving element having a main axis and intended to be driven by a drive element which, in the case of a helicopter rotor is connected to a helicopter blade, and a rigid element intended to be mounted on a structure which, for example, may be a sleeve controlling rotation of the blade, and including a damping assembly functionally connecting the driving element and the rigid element to damp vibration in at least one direction perpendicular to said main axis, the damping assembly comprising both a hydraulic damper device disposed in a cavity of viscous fluid and a flexible device having high stiffness in a direction parallel to said main axis and low stiffness in said direction perpendicular to the main axis, wherein the hydraulic damper device has first and second sets of plane laminations each having its plane perpendicular to the main axis, the first set of laminations being mounted on the driving element via a first mechanical link and the second set of laminations being mounted on the rigid element via a second mechanical link, the laminations of the first and second sets of laminations being disposed in interleaved manner and being closely spaced apart so as to present viscous damping zones each situated between one lamination of the first set and one lamination of the second set, and wherein at least one of the first and second mechanical links includes at least one elastic element presenting low stiffness parallel to the main axis so as to provide decoupling of compression excitation between the driving element and the rigid element.

In a second embodiment, the invention provides a vibration damper, in particular for a helicopter rotor, the damper comprising a driving element having a main axis and intended to be driven by a drive element and a rigid element intended to be mounted on a structure, and including a damping assembly functionally connecting the driving element and the rigid element to damp vibration in at least one direction perpendicular to said main axis, the damping assembly comprising both a hydraulic damper device disposed in a cavity of viscous fluid and a flexible device having high stiffness in a direction parallel to said main axis and low stiffness in said direction perpendicular to the main axis, wherein the hydraulic damper device has first and second sets of plane laminations each having its plane perpendicular to the main axis, the first set of laminations being mounted on the driving element via a first mechanical link and the second set of laminations being mounted on the rigid element via a second mechanical link, the laminations of the first and second sets of laminations being disposed in interleaved manner and being closely spaced apart so as to present viscous damping zones each situated between one lamination of the first set and one lamination of the second set, and wherein each lamination of at least one of the first and second sets of laminations has at least one region in which the laminations are not interleaved with the laminations of the other set, said regions of said laminations being dimensioned so as to give the hydraulic damper device low stiffness in a direction parallel to said main axis so as to provide decoupling of compression excitation between the driving element and the rigid element.

The vibration damper can implement one or both of the above-mentioned embodiments, i.e. the first and/or the second above-mentioned embodiments.

At least one of said elastic elements may be made of elastomer or it may be a shaped elastic washer. The flexible device is preferably a laminated structure comprising a stack of plane laminations and of elastomer plates.

In a preferred embodiment, the driving element is a cylinder having a bottom and a cover mounted at respective ends thereof, wherein the flexible device is cylindrical and has an axis coinciding with said main axis and is mounted between the two inside faces of the cover and of the bottom respectively so as to surround said hydraulic damper device, the fluid cavity being defined by the driving element, the bottom, the cover, and the flexible device, and wherein said rigid element is disposed in a middle region of the flexible device.

BRIEF DESCRIPTION OF THE DRAWINGS

The invention will be better understood on reading the following description given by way of non-limiting example and with reference to the accompanying drawings, in which.

MORE DETAILED DESCRIPTION

Figure 1:
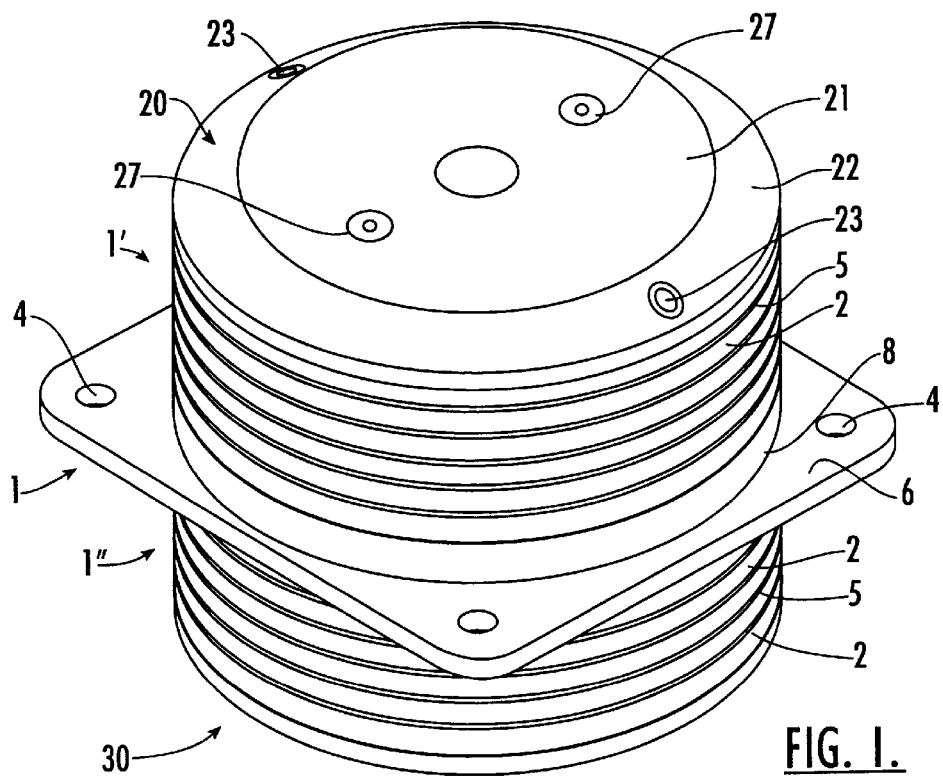
FIG. 1 is a perspective view of a vibration damper device constituting a preferred embodiment of the invention and intended for a semi-rigid helicopter rotor having bearingless blades.
Figure 2:
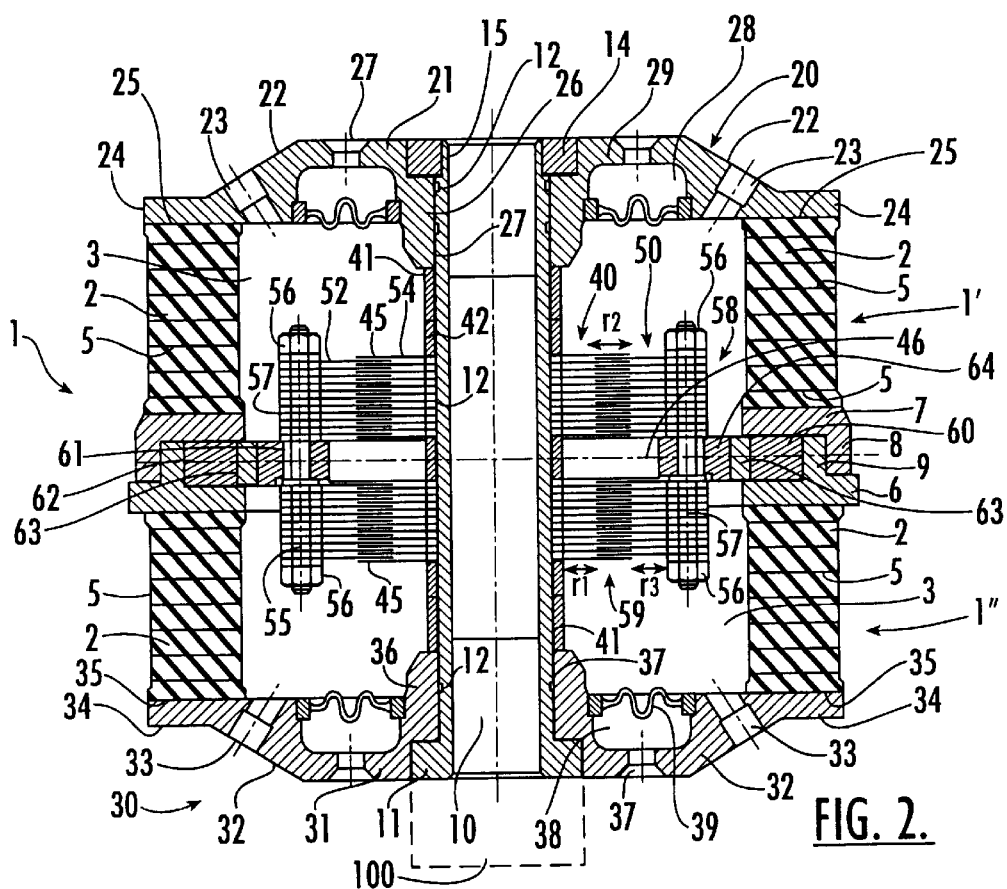
FIG. 2 is a longitudinal section through the FIG. 1 device.

The damper shown in FIGS. 1 and 2 comprises a hollow cylinder 10 of rigid material whose axis constitutes the main axis of the damper and which, because it is designed to be coupled to a helicopter blade via a drive element 100, constitutes the driving element of the damper.

There are two dampers for each blade, one mounted above the blade and the other below it, with the axis of the cylinder 10 having a nominally vertical position.

The rigid element (or "driven" element) is a collar 6 which is designed to be connected via holes 4 to a sleeve that rotates the blade.

At the ends 11 and 15, there are mounted respectively a cover 20 and a bottom 30, with this assembly being sealed by gaskets 12 received in grooves in the outside of the cylinder 10.

The cover 20 has a central region 21 in the form of a disk, surrounded by a frustoconical region 22 which is extended outwardly by a collar 24. It also has a cylindrical region 26 whose inside face 27 is mounted on the outside of the cylinder 10. The cover 20 also has an expansion compensation chamber 28 defined by a corrugated annular membrane 29. An annular face 25 of the cover 20 is pressed against a top face of a flexible device 1 of cylindrical shape comprising a laminated structure made up of a stack of metal washers 5 and of elastomer washers 2, and having its axis coinciding with the axis of the cylinder 10.

The bottom 30 has a central region 31 in the form of a disk, surrounded by a frustoconical region 32 which is extended outwardly by a collar 34. It also has a cylindrical region 37 whose inside face is mounted on the outside of the cylinder 10.

The bottom 30 also has an expansion chamber 38 defined by a corrugated annular membrane 39. An annular face 35 of the bottom 30 presses against a bottom face of the flexible device 1.

The flexible device 1 has high stiffness in a direction parallel to the main axis, and in particular against compression motion. However it has low stiffness perpendicularly to the main axis.

It is generally made of low-damping rubber which therefore dissipates little energy, e.g. an elastomer for which $\tan\delta<0.3$. In the example shown, the flexible device 1 is laminated and comprises a stack of annular metal laminations 5 and of elastomer washers 2 whose axis coincides with the main axis of the damper.

The collar 6 is mounted in a middle region of the flexible device 1 and, in the example, it subdivides it into an upper cylindrical region 1' and a lower cylindrical region 1" which are disposed symmetrically about the plane of symmetry P. An annular part 7 is mounted above the collar 6 and has a cylindrical region 8 that is centered on a complementary cylindrical region 9 of the collar 6.

In the gap between the parts 6 and 7 there is received an outer annular region 62 of an annular link ring 60 which, in the example shown in FIG. 1, has a rigid internal annular region 64, a central annular region 63 made of elastomer, and an outer annular region 62.

The hydraulic damper device has two sets of laminations or sheets, comprising a first set of laminations 40 secured to a sleeve 42 surrounding the cylinder 10, and a second set of laminations 50 which is assembled together by tie rods 55 and nuts 56 with interposed spacers 57 enabling the laminations 50 to be given the same spacing as the laminations 40. Spacers 41 are disposed between the sleeve 42 and the cylindrical regions 26 and 36.

In a cylindrical region 45 of radial extent $r_2$, the laminations 40 and 50 constitute an interleaved structure where they are narrowly spaced apart.

Figure 5:
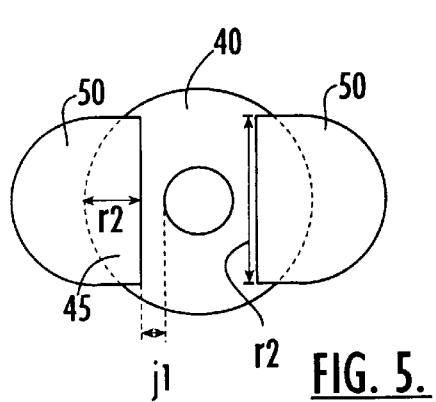
FIGS. 5 and 9 are plan views of two embodiments of the laminations.

The laminations 40 and 50 are generally flexible metal sheets or laminations, the laminations 40 are disk-shaped for example, and their axis is said main axis, while the laminations 50 may be half-moon shaped (see FIG. 5). The laminations 40 and 50 are generally a few tenths of a millimeter thick. In the region 45, the spacing between the laminations 40 and 50 may also be of the order of a few tenths of a millimeter. In a variant, the laminations 40 and 50 may all be in the form of disks.

The link element 60 is pierced by holes 61 through which the tie bars 55 pass, and the link element 60 is clamped between upper and lower stacks 58 and 59 of the laminations 40 and 50 symmetrically about the plane P perpendicular to the axis 10.

The cover 20, the bottom 30, the laminated flexible device 1, and the cylinder 10 define a cavity 3 which is filled via orifices 23 and 33 with a viscous fluid such as an oil of viscosity greater than 100,000 centistokes at ambient temperature.

It is preferable to use an oil whose viscosity at ambient temperature lies in the range 300,000 centistokes to 5,000,000 centistokes. The chambers 28 and 38 which are accessible via orifices 27 and 37 act conventionally as expansion compensation chambers for the oil-filled cavity 3.

In its region 45, the hydraulic damper device having blades 40 and 50 disposed in the cavity 3 presents stiffness that is very high parallel to the main axis, while perpendicularly to said axis it presents very low stiffness which depends on the viscosity on the oil and on the spacing between the laminations, and it also possesses an excellent damping coefficient having a value for $\tan\delta$ that can be made greater than 1 over the entire range.

According to the invention, decoupling has a low modulus of elasticity (i.e. low stiffness) parallel to the axis 10 so as to provide decoupling for compression motion, and preferably has a high modulus of elasticity (i.e. high stiffness) perpendicularly to the main axis.

this decoupling may be obtained either using a single means, or else by associating a plurality of means.

Firstly, the link element 60 may, on its own, be capable of providing this decoupling by giving the device an elastic degree of freedom parallel to the axis 10 in the mechanical link between the outside of the hydraulic damper device (tie bare 55 and nuts 56) and the collar 6. This is made possible in the example shown in FIG. 1 by the presence of the central annular region 63 of elastomer which gives the link element 60 a degree of freedom having little stiffness parallel to the main axis whereas radial stiffness remains high.

If the link element 60 as shown in FIG. 2 is replaced by a rigid metal part, then decoupling can be provided by providing overlap between the two sets of laminations 40 and 50 that is partial only, either as shown by providing overlap in a zone 45 of width $r_2$ between a non-overlap zone 54 of width $r_1$ containing only laminations 40 and a non-overlap zone 52 of width $r_3$ containing only laminations 50, or by selecting $r_1=0$ or $r_3=0$.

The values of $r_1$ and $r_3$ are selected as a function of the thickness and the number of laminations so as to provide sufficient bending elasticity in a direction parallel to the axis 10 for obtaining the desired decoupling of compression forces.

When the elastomer ring serves on its own to provide all of the decoupling, it is advantageous to ensure maximum possible overlap between the laminations 40 and 50 so as to maximize the damping effect.

The device of the invention makes it possible to ensure good decoupling of compression excitation and in particular to increase the lifetime of the damper.

In particular, since the damping takes place elastically, the assembly is always returned towards to its rest position. In addition, the elastic displacement induced by compression excitation does not have any influence on damping. In the overlap zone 45 which is the zone in which shear damping is active, the decoupling induces forces parallel to the main axis only. Because of the high viscosity of the oil, the stiffness of the active portion 45 of the damper device is very high and it can be assumed that in the direction parallel to the main axis, the overlap zone 45 behaves like a rigid block. Compression excitation coming from the driving element 10 tends to compress the film of oil present between the laminations 40 subjected to the compression excitation and the laminations 50 in the overlap zone 45. In the non-overlap zone(s), compression excitation tends only to bend the laminations without compressing the film of oil, thus giving rise to elastic bending behavior.

In addition, in the device of the invention, thermal dissipation takes place essentially in the cavity 3.

Figure 3:
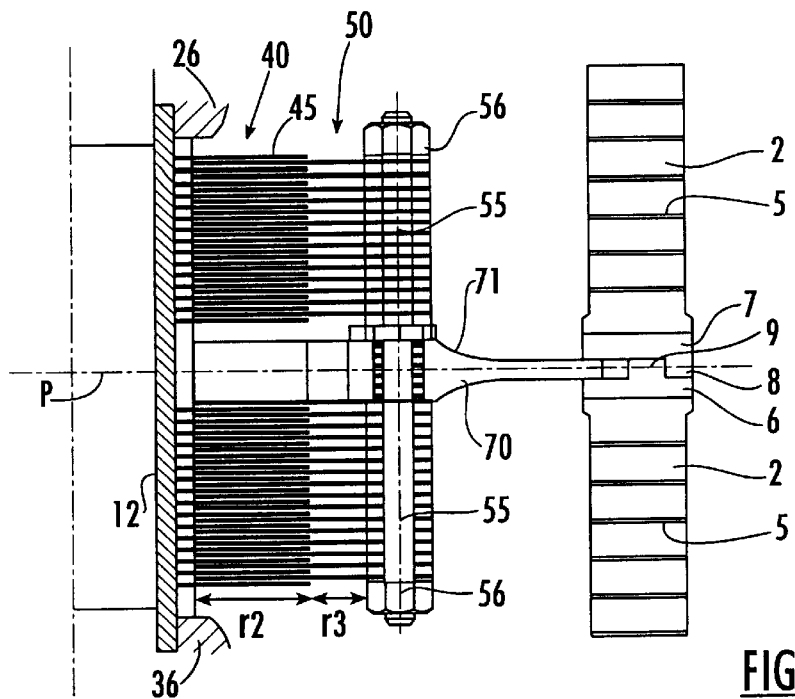
FIGS. 3, 4, 6, 7a, 7b, and 8 show variants of the FIG. 2 device.

FIG. 3 is a fragmentary section through a variant embodiment of the invention. By way of illustration, it shows the case where $r_1=0$ and $r_3=0$.

In addition, the link element 60 of FIG. 2 has been replaced by an elastic metal washer 70 of profile 71 that tapers towards the periphery of the damper.

As in the example of FIGS. 1 and 2, the damper device has an axis of symmetry which is the main axis and a plane of symmetry which is the midplane P.

It will also be observed that in the preferred variants corresponding to FIGS. 1 to 6, the elements providing decoupling for compression excitation are disposed outside the line of action of the forces, which line is situated on the main axis, such that the compressive excitation to be decoupled is transmitted by the cover 20 and the bottom 30. It will be observed that the forces corresponding to compression excitation are large, and the value thereof may be of the order of 1,000 daN and more, with an amplitude that may lie in the range 1 mm to 10 mm.

Figure 4:
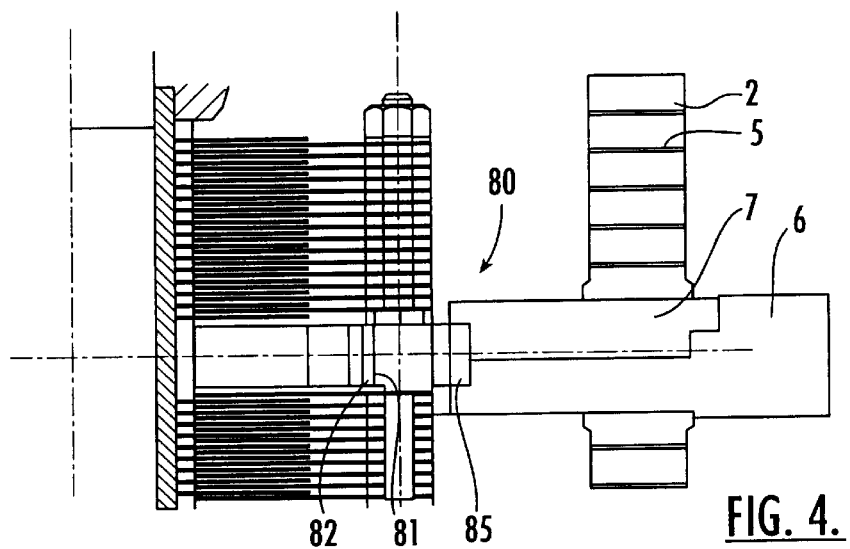
Figure 6:
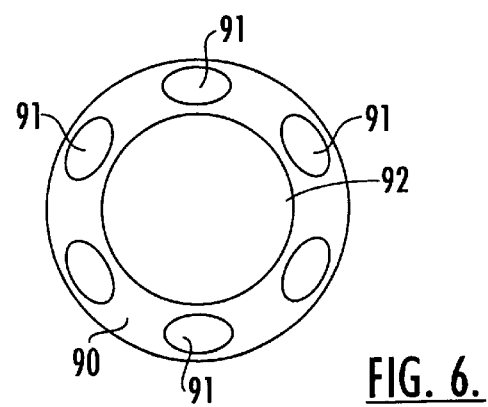

In the embodiment shown in FIG. 4, decoupling is provided by a laminated device 80 held between the two stacks of laminations 58 and 59 by the tie bars 55. The device 80 comprises alternating cylindrical metal laminations 81 and cylindrical regions 82 of elastomer, with its axis being the main axis, so as to obtain a low modulus of elasticity parallel to the axis and a high modulus of elasticity perpendicularly thereto. The laminated device 80 is gripped at 85 between the parts 6 and 7. FIG. 6 shows an annular link element 90 suitable for replacing the link element 60 of FIG. 2. It is in the form of a metal disk 90 having a central opening 92 and it is pierced by openings 91 distributed around its circumference.

Decoupling may also be obtained in the link between the cylinder 10 and the laminations 40, by replacing the rigid spacers 41 by springs or by stacks of spring (Belleville) washers. In this configuration, the sleeve 42 is capable of sliding along the cylinder, and it is returned elastically by the springs or the stacks of washers.

Figure 7A:
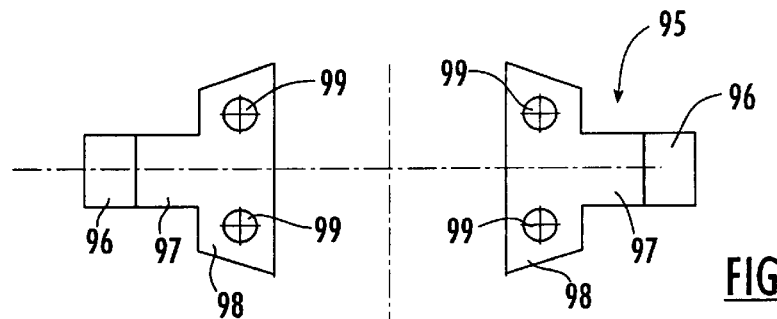
Figure 7B:
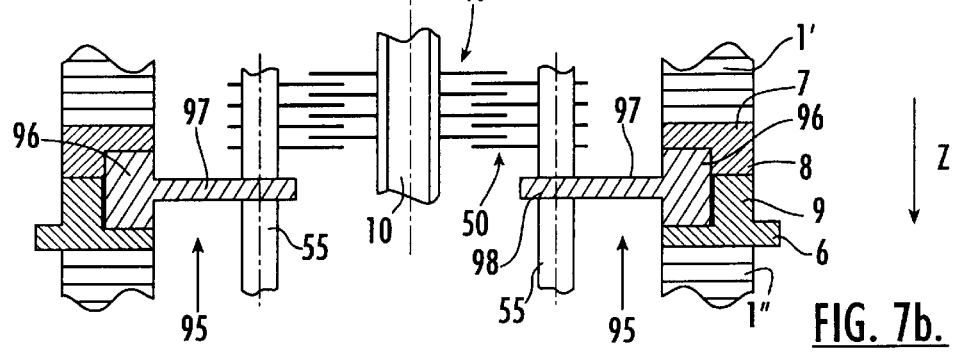

The device of the invention may include a plurality of elastic elements surrounding only a portion of the periphery of the corresponding mechanical link. As shown in FIGS. 7a (plan view) and 7b (longitudinal section), decoupling is achieved by at least two parts 95, e.g. metal parts, each presenting a region 96 serving to be gripped between the parts 6 and 7, a central region 97 forming a flexible blade, and a region 98, e.g. of trapezoidal shape, having openings 99 through which the tie bars 55 can pass for inner fixing of the part 95.

Figure 8:
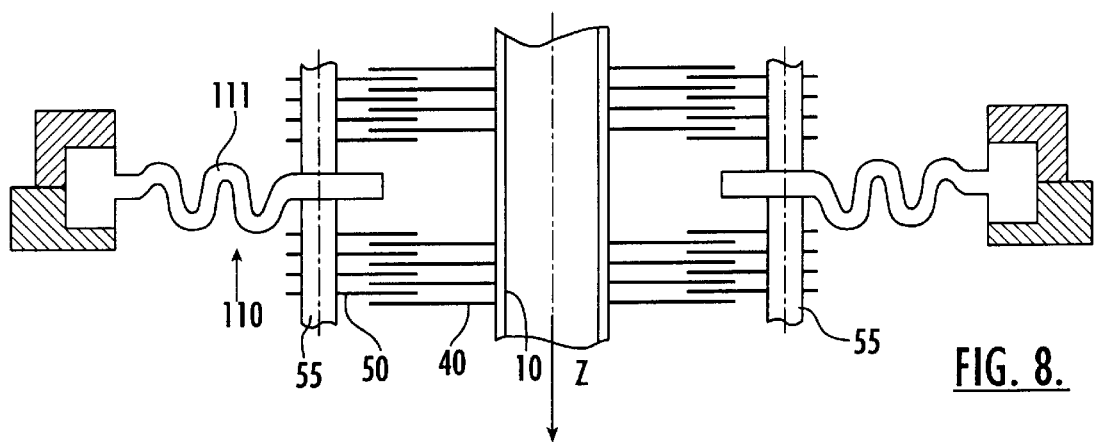

The variant of FIG. 8 (longitudinal section) consists in a corrugated membrane 110 provided with corrugations 111 that are circularly symmetrical about the main axis Z.

According to the invention, the laminations of the first and second sets can be interleaved in such a manner as to give the damper device different clearances $j_1, j_2$ in two mutually perpendicular directions perpendicular to the main axis, where such clearances are a function in particular of the extreme movements of the damper, and/or to give it different overlap distances $r_2$ and $r_2'$ in said two directions.

Figure 9:
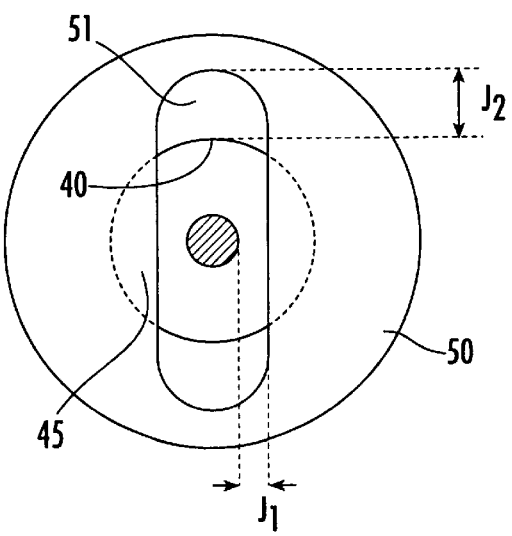

By way of example, in FIG. 5, $r_2 \neq r_2'$. In FIG. 9, the laminations 40 and 50 are disk shaped, but the laminations 50 have a central opening 51 that is elongate in one radial direction, giving $j_1 \neq j_2$.

We claim:

1. A vibration damper comprising:

a driving element having a main axis and intended to be driven by a drive element;

a rigid element intended to be mounted on a structure; and a damping assembly functionally connecting the driving element and the rigid element to damp vibration in at least one cross-wise direction perpendicular to said main axis, the damping assembly comprising:

a flexible device connected with the rigid element and defining a cavity which at least partially surrounds the driving element and is filled with viscous fluid, the flexible device having low stiffness in said cross-wise direction so as to permit relative movement between the driving element and the rigid element in said cross-wise direction; and a hydraulic damper device disposed in the cavity of viscous fluid and including first and second sets of plane laminations each having its plane perpendicular to the main axis, the first set of laminations being mounted on the driving element via a first mechanical link and the second set of laminations being mounted on the rigid element via a second mechanical link, the laminations of the first and second sets of laminations being disposed in interleaved manner and being closely spaced apart so as to present viscous damping zones each situated between one lamination of the first set and one lamination of the second set, and wherein at least one of the first and second mechanical links includes at least one elastic element presenting low stiffness parallel to the main axis, the elastic element providing a direct non-rigid elastic connection for compressive excitations between the respective one of the driving and rigid elements and the corresponding set of laminations so as to provide decoupling of compression excitation between the respective one of the driving and rigid elements and the corresponding set of laminations and thereby decouple compressive excitations between the driving element and the rigid element.

2. A vibration damper comprising:

a driving element having a main axis and intended to be driven by a drive element;

a rigid element intended to be mounted on a structure; and a damping assembly functionally connecting the driving element and the rigid element to damp vibration in at least one cross-wire direction perpendicular to said main axis, the damping assembly comprising:

a flexible device connected with the rigid element and defining a cavity which at least partially surrounds the driving element and is filled with viscous fluid, the flexible device having low stiffness in said cross-wise direction so as to permit relative movement between the driving element and the rigid element in said cross-wise direction; and a hydraulic device disposed in the cavity of viscous fluid and including first and second sets of plane laminations each having its plane perpendicular to the main axis, the first set of laminations being mounted on the driving element via a first mechanical link and the second set of laminations being mounted on the rigid element via a second mechanical link, the laminations of the first and second sets of laminations being disposed in interleaved manner and being closely spaced apart so as to present viscous damping zones each situated between one lamination of the first set and one lamination of the second set, and wherein at least one of the first and second sets of laminations has at least one non-overlap region in which the laminations are not interleaved with the laminations of the other set such that each lamination of said at least one set has an overlap portion and a non-overlap portion, the non-overlap portion being flexible so as to provide a direct non-rigid elastic connection between the overlap portion and the corresponding mechanical link, said non-overlap portions being dimensioned so as to give the hydraulic damper device low stiffness in a direction parallel to said main axis so as to provide decoupling of compression excitation between the respective one of the driving and rigid elements and the overlap portions of the corresponding set of laminations and thereby decouple compressive excitations between the driving element and the rigid element.

3. A vibration damper according to claim 2, wherein at least one of the first and second mechanical links includes at least one elastic element which has low stiffness parallel to the main axis so as to ensure decoupling of compression excitation.

4. A vibration damper according to claim 1, wherein one of said elastic elements has a high modulus of elasticity perpendicularly to the main axis.

5. A vibration damper according to claim 1, wherein at least one elastic element includes at least one metal washer or a laminated device or a spring or a membrane.

6. A vibration damper according to claim 1, including a plurality of elastic elements, each elastic element surrounding only a portion of the periphery of the corresponding mechanical link.

7. A vibration damper according to claim 1, wherein the laminations of the first set are disk-shaped and wherein the laminations of the second set are half-moon shaped.

8. A vibration damper according to claim 1, wherein the laminations of the first and second sets are interleaved with clearances and overlap distances between the laminations in such a manner as to make at least one of the clearances and overlap distances different in two mutually perpendicular directions perpendicular to the main axis.

9. A vibration damper according to claim 1, wherein the flexible device is a laminated structure comprising a stack of plane laminations and of elastomer plates.

10. A vibration damper according to claim 1, wherein the driving element is a cylinder having a bottom and a cover mounted at respective ends thereof, wherein the flexible device is cylindrical and has an axis coinciding with said main axis and is mounted between the two inside faces of the cover and of the bottom respectively so as to surround said hydraulic damper device, the fluid cavity being defined by the driving element, the bottom, the cover, and the flexible device, and wherein said rigid element is disposed in a middle region of the flexible device.

11. A vibration damper according to claim 1, wherein the viscous fluid has viscosity at ambient temperature exceeding 100,000 centistokes, and preferably lying in the range 300,000 centistokes to 5,000,000 centistokes.

12. The vibration damper according to claim 1 wherein the laminations of at least one of the first and second sets are flexible.

13. The vibration damper according to claim 3 wherein one of said elastic elements has a high modulus of elasticity perpendicularly to the main axis.

14. The vibration damper according to claim 3 wherein at least one elastic element includes at least one of a metal washer, a laminated device, a spring, and a membrane.

15. The vibration damper according to claim 3, further comprising a plurality of elastic elements, each elastic element surrounding only a portion of the periphery of the corresponding mechanical link.

16. The vibration damper according to claim 2 wherein the laminations of the first and second set are disk-shaped and the laminations of the second set are half-moon shaped.

17. The vibration damper according to claim 2 wherein the laminations of the first and second sets are interleaved with clearances and overlap distances between the laminations in such a manner as to make at least one of the clearances and overlap distances different in two mutually perpendicular directions perpendicular to the main axis.

18. The vibration damper according to claim 2 wherein the flexible device is a laminated structure comprising a stack of plane laminations and of elastomer plates.

19. The vibration damper according to claim 2 wherein the driving element is a cylinder having a bottom and a cover mounted at respective ends of the cylinder, wherein the flexible device is cylindrical and has an axis coinciding with the main axis and is mounted between inside faces of the bottom and cover so as to surround the hydraulic damper device, the fluid cavity being defined between the driving element, the bottom, the cover, and the flexible device, and wherein the rigid element is disposed in a middle region of the flexible device.

20. A vibration damper according to claim 2 wherein the viscous fluid has a viscosity at ambient temperature exceeding 100,000 centistokes.

* * * * *

UNITED STATES PATENT AND TRADEMARK OFFICE
CERTIFICATE OF CORRECTION

PATENT NO. : 5,979,618
DATED : November 9, 1999
INVENTOR(S) : Sieg et al.

It is certified that error appears in the above-identified patent and that said Letters Patent is hereby corrected as shown below:

Column 7, line 9, "cross-wire" should read --cross-wise--; line 18, after "hydraulic" insert --damper--.

Signed and Sealed this

Fourth Day of April, 2000

Attest:

Q. TODD DICKINSON

Attesting Officer

Director of Patents and Trademarks